United States Patent

[11] 3,563,353

[72] Inventors Roy F. LoPresti
 Chicago, Ill.;
 Edwin A. Peterson, Manhasset; Oswald B. Grimstad, Rockville Centre, N.Y.
[21] Appl. No. 740,708
[22] Filed June 27, 1968
[45] Patented Feb. 16, 1971
[73] Assignee United Parcel Service General Service Co. New York, N.Y.

[54] AUTOMATIC REVERSING CLUTCHES WITH PILOT BRAKE
 1 Claim, 3 Drawing Figs.

[52] U.S. Cl. .................................................. 192/21,
 192/4, 192/48.92, 192/51, 192/35, 74/810; 188/83
[51] Int. Cl. ........................................................ F16h 57/10,
 F16d 43/30
[50] Field of Search .......................................... 192/20,
 48.92, 51; 192/21, 4R; 74/335, 810, 812; 192/35
 (Cursory)

[56] References Cited
 UNITED STATES PATENTS
| | | | |
|---|---|---|---|
| 1,441,528 | 1/1923 | Reid et al. | 74/812X |
| 1,555,248 | 9/1925 | Hansen | 74/812X |
| 3,299,730 | 1/1967 | Barsam et al. | 192/31X |
| 2,047,392 | 7/1936 | Steele | 192/51UX |
| 2,643,614 | 6/1953 | Rosenkrans | 192/51X |
| 3,292,753 | 12/1966 | Svaty et al. | 192/20X |
| 3,411,611 | 11/1968 | Powell | 192/36X |

FOREIGN PATENTS
| | | | |
|---|---|---|---|
| 668,220 | 11/1938 | Germany | 192/20 |

*Primary Examiner*—Benjamin W. Wyche
*Attorney*—James Albert Drobile

ABSTRACT: Torque transmitting apparatus having two intermeshed helical gears which employs the axial thrust of the helical gears to shift the driven gear longitudinally along its axis, in a direction dependent upon the direction of rotation of the driving gear, so as to effect a clutching action between the driven gear and alternately one of two output members disposed on either side of the driven helical gear. Apparatus for synchronizing a positive engaging ratchet tooth clutch including a cam surface on one of the clutch members and a cam follower on the other clutch member to cam the moveable clutch member longitudinally toward the stationary clutch member while maintaining the ratchet teeth out of engagement one with another until the moveable clutch member has moved through its full longitudinal travel and into complete engagement with the other clutch member.

Patented Feb. 16, 1971

INVENTORS
ROY F. LoPRESTI
EDWIN A. PETERSON
OSWALD B. GRIMSTAD
BY *James Albert Brobile*
ATTORNEY Patented Feb. 16, 1971 3,563,353

INVENTORS
ROY F. LoPRESTI
EDWIN A. PETERSON
OSWALD B. GRIMSTAD

BY *James Albert Drobile*

ATTORNEY

AUTOMATIC REVERSING CLUTCHES WITH PILOT BRAKE

SUMMARY OF THE INVENTION

The present invention is concerned with automatic transmissions and, more specifically, is directed to an automatic transmission which will shift automatically between two alternative output members entirely in response to the direction of rotation of the input member.

In many transmission applications, it is necessary that the transmission have two outputs for operating different mechanical components at different times. To alternatively supply power through the transmission to either of the outputs, some suitable shifting mechanism must be provided to shift selected components within the transmission. The shifting mechanism necessarily must be coordinated with the supply of power to the input of the transmission both in respect to when the power is being applied to the transmission and to the direction of rotation of the input power. The necessary interconnection and coordination of the shifting mechanism with the power input apparatus for the transmission has many disadvantages, among which are the added size and weight of the components, the cost thereof, and the inherent decrease in reliability which occurs with increased number of components.

It is an object of the present invention to provide a novel transmission which affords significant advantages and avoids the aforementioned difficulties, by providing a shifting action to and from at least one output of the transmission solely as a function of the direction of rotation of the input to the transmission.

In one embodiment of the present invention, the shifting between one output and another output is controlled solely by the direction of rotation of the input to the transmission. In general, the transmission employs an idler shaft on which there is disposed a driven helical gear, this gear being free for rotational and longitudinal movement along the idler shaft. The driven helical gear is in engagement with a mating helical driving gear which is disposed on an axis of rotation parallel with that of the driven gear, and which is free only for rotational movement. One of the two mating helical gears, preferably but not necessarily the driving gear, must be substantially elongated in an axial direction in comparison with the other gear. The transmission of torque from the driving gear to the driven gear will, depending upon the direction of rotation of the driving gear, exert a longitudinal or axial force component upon the driven gear by reason of the helical angle of the gear teeth. The resulting longitudinal force will move the driven gear longitudinally along the idler shaft in a direction dependent solely upon the direction of rotation of the input shaft. This alternative longitudinal or axial displacement of the driven gear, in a direction dependent upon the direction of rotation of the driving gear, is utilized to effect, alternately, an engagement and a disengagement between the driven gear and an output member disposed to one side of the driven gear and having a common axis of rotation therewith. In one preferred embodiment, this longitudinal displacement of the driven gear is utilized to effect a clutching action between the driven gear and, alternatively, either of two output members disposed on either side of the driven gear and having a common axis of rotation therewith, the choice of output member depending on the direction of rotation of the driving gear. In this embodiment, the clutching action results from positive acting ratchet clutch teeth on the driven gear and the two output members which come into engagement as the driven gear moves longitudinally onto contact with either of the output members.

The transmission of the present invention further includes a brake in frictional engagement with the driven gear. This brake operates to insure that, during shifting, the torque being transmitted through the gears provides a force component longitudinally along the axis of the driven gear of sufficient magnitude to effect the shifting action.

Other objects and advantages of the invention will become more fully apparent from an examination of the following specification and claims and the accompanying drawings.

DETAILED DESCRIPTION OF INVENTION

Figure 1:
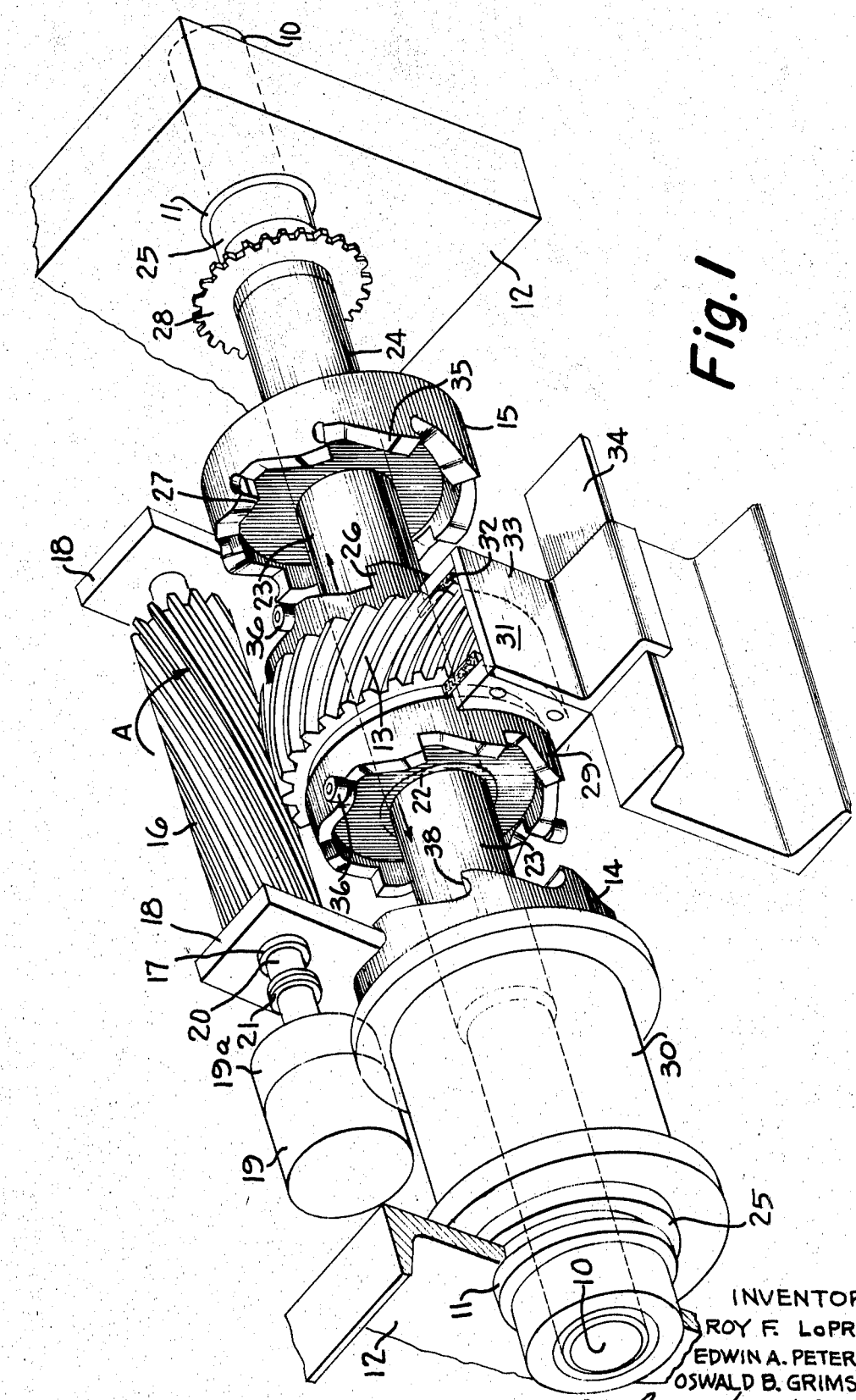
FIG. 1 is a perspective view of one embodiment of the novel transmission apparatus.

As shown in FIG. 1, one embodiment of the apparatus of the present invention includes a carrier shaft 10 suitably journaled by means of bearings 11 in bearing blocks 12 at either end of the shaft. The carrier shaft 10 is continuous between the bearing blocks 12 and supports a driven gear 13 and two output clutch members 14 and 15 as hereinafter described.

In driving engagement with gear 13 is an elongated driving gear 16 which is supported by means of a drive shaft 20 which is suitably journaled in bearings 17 disposed within support blocks 18 at either end of the shaft 20. A drive motor 19 and speed reduction mechanism 19a likewise suitably supported within the apparatus provide the driving torque for the transmission through a drive coupling 21.

Gears 13 and 16, in the embodiment shown, are helical gears. It is inherent with helical gears that the driving force in the plane normal to that of the teeth of the helical gear is composed of two force components, viz, one in the diametral plane of the gear and the second constituting an end thrust or axial or longitudinal thrust on the helical gear. The magnitude of this end thrust depends upon the torque being transmitted and the helix angle of the gear. The direction of the end thrust is dependent initially upon the direction of the helix angle. However, the direction of the end thrust will reverse upon a reversal of the torque being applied to the driven gear, i.e., upon a reversal in the direction of rotation of the driving gear.

Returning to the embodiment of FIG. 1, the helical gear 13 is shown as journaled by means of bearings 22 on an inner idler shaft 23, which is free to rotate on the carrier shaft 10. The bearings 22 are not locked on the inner idler shaft 23, but allow the helical gear 13 to be displaced in either direction longitudinally along the inner idler shaft 23 in the direction of the two output clutch members 14 and 15.

The output clutch member 15 is bolted to a similar idler shaft 24 and thus is secured against longitudinal movement thereon, but is free to rotate with the idler shaft which is freely journaled on the carrier shaft 10. The output clutch member 14 similarly is secured to an idler shaft (not visible in FIG. 1) and likewise is secured against longitudinal movement but is free to rotate. Thrust sleeves 25 at either end of the two outer idler shafts secure the idler shafts against longitudinal movement.

Assuming now that the drive motor 19 and speed reducer 19a are rotating the driving gear 16 in the direction of the arrow A, the side thrust on the driven helical gear 13 will be to the right toward the output clutch member 15. This resultant side thrust will cause the driven gear 13 to be displaced longitudinally along the driving gear 16 and into engagement with the output clutch member 15. The plurality of ratchet teeth 26 on the driven gear 13 will then come into engagement with a corresponding complimentary plurality of ratchet teeth 27 on the output clutch member 15. The driving force of the transmission will then be transmitted to the idler shaft 24 form which it may be taken off as, for example, by means of a sprocket wheel 28.

Assuming now that the direction or rotation of the driving gear 16 is reversed by reversing the direction of motor 19, the direction of rotation of the driven gear 13 will now reverse and, consequently, the direction of end thrust on the gear 13 will be to the left in the direction of the output clutch member 14. As the driven gear 13 reverses its longitudinal direction, the corresponding ratchet teeth 26 and 27 will separate and the resultant end thrust will displace the driven gear 13 longitudinally along the idler shaft 23. When the driven gear 13 reaches the output clutch member 14, similar but oppositely disposed ratchet teeth 29 on the driven gear 13 engage corresponding ratchet teeth (not visible in FIG. 1) on the output clutch member 14. The resultant torque flow through the transmission is now to the end idler shaft supporting the output clutch member 14, and may be taken off from the transmission by any suitable means such as here shown to be a winch drum 30.

To assure positive and prompt shifting of the transmission, a friction drag brake 31 is employed. This drag brake employs two spring-loaded friction blocks 32 which are carried by a supporting member 33, and which are in compressive, frictional contact with the corresponding side faces of gear 13. The supporting member 33 is keyed to a rail 34 so as to be free to move longitudinally along with the driven gear 13. The resultant drag of the brake 31 on the driven gear 13 will ensure that the longitudinal or axial force component of the torque being transmitted between the driving and driven gears is sufficient to effect the longitudinal shifting action of the driven gear.

Synchronization of the ratchet clutch elements employed is accomplished by means of at least one and preferably a plurality of cam faces on one of the clutch elements, i.e., on an output clutch member or on the clutch element on the driven gear, cooperating with at least one and preferably a plurality of cam followers on the other clutch element. Both the cam face or faces and the cooperating cam follower or followers are disposed at a common radius beyond that of the ratchet teeth. In one embodiment, both the the output clutch members include at least one and preferably a plurality of cam faces at a radius beyond that of the ratchet teeth, and at least one and preferably a plurality of cam followers are, in like manner, disposed on each side of the driven gear at a radial distance equal to that of the cam face or faces.

Figure 2:
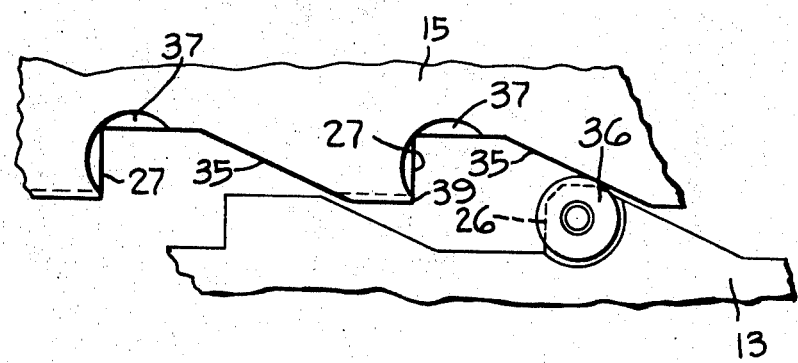
FIG. 2 is a partial side view of the novel self-synchronizing clutch apparatus moving into engagement.
Figure 3:
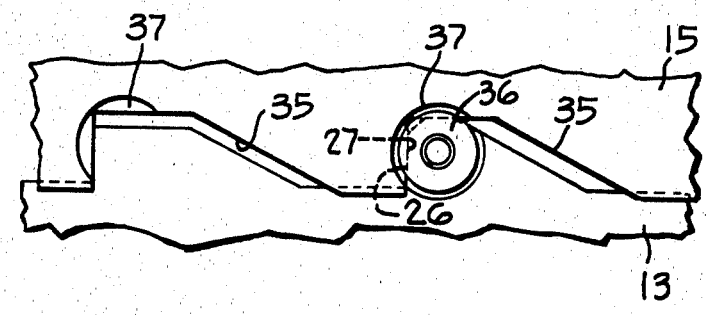
FIG. 3 is a partial side view of the novel self-synchronizing clutch apparatus in engagement.

In the embodiment shown in FIG. 1, the axis of rotation of the cam followers 36 is perpendicular to the axis of rotation of the driven gear 13, and each is so sized and positioned that its outer cylindrical surface is disposed slightly beyond the outer surface of the underlying clutch tooth, which also can be cut back. The cam faces 35 are disposed in a plane parallel to the transverse axes of the output clutch member and generally inclined at an angle with respect to the longitudinal axis thereof. As the driven gear 13 approaches the output clutch member 15, as shown in FIG. 2, the cam follower 36 will come into rolling contact with the cam face 35. The contour of the cam face 35 and the dimensions of the cam follower 36 are so designed that, when in such contact, they will prevent the ratchet teeth 26 and 27, of the driven gear 13 and output clutch member 15, respectively, form engaging one another until the driven gear 13 is in proper angular synchronization with the output clutch member 15 and has, as well, reached the limit of its longitudinal travel into engagement with the output clutch member 15. When this point is reached between the driven gear 13 and the output clutch member 15, as shown in FIG. 3, the cam follower 36 is permitted to pass into an oversized detent 37 at the end of the cam surface 35. The detent 37 permits the ratchet teeth 26 and 27 to positively engage one another without further separation or interference by the cam follower 36.

Regardless of the angular alignment of the ratchet teeth 26 and 27 upon initial approach of the clutch elements, the cam follower 36 will assure proper synchronization. For example, the edge of the ratchet tooth 26 of the driven gear 13 were in interfering alignment with the edge of the ratchet tooth 27 of the output clutch member 15, then, in the absence of the cam follower 36, the teeth would bear unreasonably on one another and this possibly would result in damage to the ratchet teeth. However, with the cam follower 36, the opposing teeth in such a position cannot engage one another, and the driven gear 13 and the output clutch member 15 will be displaced rotationally relative to one another by the cam follower either rolling directly down into the detent 37 or rolling upwardly over the outer edge 39 of the cam face and then normally down the cam face 35 as above described.

The output clutch 14 includes identical but oppositely disposed cam faces 38 thereon, which operate in conjunction with the cam followers 36 disposed on the opposite side of the gear 13 to effect synchronization and engagement of the clutch elements in the same manner as above described whenever the driven gear 13 is displaced toward the output clutch member 14.

The rolling action provided by the cam follower on the cam face will eliminate sliding action between the ratchet teeth prior to engagement, thus avoiding wear of the ratchet teeth, and will as well assure perfect synchronization between the ratchet teeth upon engagement. Further, due to the reduced resistance of the rolling action in contrast to sliding action, the ease of engagement and disengagement of the clutch is decisively improved.

In a specific embodiment of the transmission of the present invention, the driving gear was about 3.5 inches in pitch diameter, about 4 inches in axial width, and had 20 teeth. The driven gear was about 10.1 inches in pitch diameter, about 2 ¾ inches in axial width, and had 57 teeth. The helix angle of both gears was 45°. By virtue of a motor and speed reducer, the driving gear was operated at approximately 3 r.p.m. and transmitted a torque of 675 foot pounds. A drag brake induced a drag in the driven gear of between about 3 and 5 foot pounds.

The driven gear included a similar but oppositely disposed clutch element of each of its opposing side faces. The clutch elements consisted of eight diametral ratchet jaws or teeth about ½ inch in height and equally spaced in an annular area about 7 182 inches in outside diameter. Disposed radially outside of the plane of such teeth, and extending to an outside diameter of about 8 ½ inches, were eight equally spaced and identical cam faces, each extending circumferentially and generally towards the base of the teeth of the clutch element to an oversized semicylindrical detent about ⅜ inch in diameter. Each of the output members disposed on opposite sides of the driven gear included eight equally spaced ratchet jaws or teeth adapted in size and configuration to cooperate with the opposing clutch element on the driven gear. Mounted radially outside of these teeth, on separate shafts generally perpendicular to the axis of rotation of the clutch member, and extending to an outer diameter of about 8 ½ inches, were two diametrically opposed cylindrical cam followers of about 5/16 inch in outer diameter. Each of these cam followers was so positioned that its circumference extended slightly beyond the outermost extremity of the underlying tooth, such tooth being slightly attenuated in height and modified in shape to permit of contact only between the cam follower and its cooperating cam faces. In neutral position, the minimum clearance between the cam follower and the opposing cam face was about ⅛ inch on each side of the driven gear.

The driven gear and its opposing output members were mounted on separate shaft elements having a common axis which was parallel to the axis of the driving gear. The driving gear and the two output clutch members were adapted for independent rotational movement alone, while the driven gear was adapted for both axial and rotational movement.

In operation, the above-specified transmission apparatus performs generally as hereinbefore described, to shift the output alternatively between the two output members in response to a change in the direction of rotation of the driving gear.

The foregoing apparatus has been described with respect to a particular and preferred embodiment thereof. However, it is anticipated that the concepts of the present invention may be embodied in other arrangements of gears which will produce side thrusts other than those disclosed. Likewise, it is anticipated that configurations of camming means other than that shown in the drawings may be utilized in accordance with the concept for synchronizing the ratchet teeth or other clutch elements.

The apparatus herein disclosed for synchronizing a positive action clutch also is disclosed, and is claimed, in the copending application of Oswald B. Grimstad, entitled "Self-synchronizing clutch," of even filing date herewith, S.N. 740,560.

We claim:

1. A torque-responsive transmission comprising:
   a. reversible drive means;
   b. a drive shaft;
   c. an elongated, helical driving gear rigidly mounted on said drive shaft;
   d. connecting means interconnecting said drive shaft and said drive means;
   e. an output shaft parallel to said drive shaft;
   f. helical driven gear means slidably mounted on said output shaft in reciprocably translatable engagement with said drive gear, and having opposing driving clutch members;
   g. driven clutch members rigidly rotatably mounted on said output shaft on opposite sides of said driven gear means and respectively adapted to be driven by the opposing driving clutch members; and
   h. brake means comprising a rail substantially parallel to said output shaft, an upstanding supporting member, slidably mounted on said rail, and a pair of opposing spring loaded friction blocks, mounted on said supporting member and constantly engaging opposing faces of said driven gear means, whereby a positive driving engagement is achieved between said driving gear and said driven gear in all positions of displacement of said driven gear between said opposing driven clutch members.